United States Patent
Huang et al.

(10) Patent No.: US 11,863,819 B2
(45) Date of Patent: Jan. 2, 2024

(54) CONTENT CONSUMPTION MONITORING

(71) Applicant: BCE Inc., Verdun (CA)

(72) Inventors: Hailun Huang, Burlington (CA); Haki Sharifi, Mississauga (CA); Chris Snyder, Toronto (CA); Olena Chernukhina, Toronto (CA); Peter Santos, Woodbridge (CA); Theodore Tse, Toronto (CA)

(73) Assignee: BCE Inc., Verdun (CA)

( * ) Notice: Subject to any disclaimer, the term of this patent is extended or adjusted under 35 U.S.C. 154(b) by 200 days.

(21) Appl. No.: 17/174,808

(22) Filed: Feb. 12, 2021

(65) Prior Publication Data

US 2021/0176525 A1 Jun. 10, 2021

Related U.S. Application Data

(62) Division of application No. 14/752,317, filed on Jun. 26, 2015, now abandoned.

(60) Provisional application No. 62/018,045, filed on Jun. 27, 2014.

(51) Int. Cl.
*H04N 21/442* (2011.01)
*H04N 21/2543* (2011.01)

(52) U.S. Cl.
CPC ... *H04N 21/44204* (2013.01); *H04N 21/2543* (2013.01)

(58) Field of Classification Search
CPC ........... H04N 21/2404; H04N 21/2405; H04N 21/254; H04N 21/44204; H04N 21/2543
See application file for complete search history.

(56) References Cited

U.S. PATENT DOCUMENTS

| | | | | |
|---|---|---|---|---|
| 7,367,039 | B2* | 4/2008 | Allen | H04N 7/17309 348/192 |
| 8,793,714 | B2* | 7/2014 | Kelsen | H04N 21/6168 725/111 |
| 2004/0031056 | A1* | 2/2004 | Wolff | H04N 21/235 725/110 |
| 2008/0263582 | A1* | 10/2008 | Okamoto | H04N 21/2543 348/E7.056 |
| 2009/0089844 | A1* | 4/2009 | Beyabani | H04N 7/17318 725/87 |
| 2010/0100898 | A1* | 4/2010 | Pfleging | H04N 21/25875 725/28 |
| 2011/0314502 | A1* | 12/2011 | Levy | H04N 21/4532 725/46 |
| 2012/0289147 | A1* | 11/2012 | Raleigh | H04N 21/25808 455/3.06 |
| 2014/0122703 | A1* | 5/2014 | Pugh | H04L 67/306 709/224 |
| 2014/0344894 | A1* | 11/2014 | Moroney | H04N 21/25841 726/4 |
| 2015/0078229 | A1* | 3/2015 | Choi | H04W 56/001 370/329 |

(Continued)

*Primary Examiner* — Michael B. Pierorazio (57) ABSTRACT

Monitoring consumption of media content on a device may include receiving a media content playback event at a content consumption device, generating a content consumption notification message including subscriber information, content consumption device information, media content playback event identifier, and media content information, and transmitting the generated consumption notification message to a content consumption monitoring system.

20 Claims, 8 Drawing Sheets

(56) References Cited

U.S. PATENT DOCUMENTS

| | | | |
|---|---|---|---|
| 2015/0222939 A1* | 8/2015 | Gallant | H04L 43/062 725/9 |
| 2015/0249864 A1* | 9/2015 | Tang | H04N 21/4667 725/28 |
| 2016/0080804 A1* | 3/2016 | Firth | H04N 21/2407 725/14 |

* cited by examiner

CONTENT CONSUMPTION MONITORING

RELATED APPLICATIONS

This application claims the benefit of U.S. Provisional Application 62/018,045 filed Jun. 27, 2014, which is incorporated herein by reference in its entirety.

TECHNICAL FIELD

The current disclosure relates to monitoring content consumption and in particular to monitoring content consumption across multiple content viewing devices.

BACKGROUND

Media content, such as television shows, movies and sporting events can be viewed on a number of different content consumption devices. The content consumption devices may include, for example, television sets, smart phones, tablets as well as browsers on computers. A user may subscribe to one or more services that provide access to specific content across one or more of the content consumption devices. For example, a TV provider, such as a cable TV or satellite TV provider can provide access to different TV channels or programming according to a subscription package. Depending upon the user's subscription, they may be authorized to view the content on one or more different types of the content consumption devices over one or more different networks or delivery (distribution) platforms.

With users able to view content across multiple devices, possibly using different delivery platforms or channels, such as wired networks, satellites, WiFi networks, and/or cellular networks, it would be beneficial to track users' consumption of content or media assets on one or more of the different devices and possibly across the different access or network technologies.

BRIEF DESCRIPTION OF THE DRAWINGS

Embodiments are described herein with references to the appended drawings, in which.

DETAILED DESCRIPTION

In accordance with the present disclosure, there is provided a method for monitoring consumption of media content comprising: receiving a media content playback event at a content consumption device; generating a content consumption notification message including subscriber information, content consumption device information, media content playback event identifier, and media content information; and transmitting the generated consumption notification message to a content consumption monitoring system.

In accordance with the present disclosure, there is further provided a device for consuming media content comprising: a processing unit for executing instructions; and a memory unit for storing instructions, which when executed by the processing unit configure the system to provide: media consumption functionality for playback of media content; and media consumption monitoring functionality for: receiving a media content playback event at a content consumption device; generating a content consumption notification message including subscriber information, content consumption device information, media content playback event identifier, and media content information; and transmitting the generated consumption notification message to a content consumption monitoring system.

In accordance with the present disclosure, there is further provided a device for monitoring media content consumption comprising: a processing unit for executing instructions; and a memory unit for storing instructions, which when executed by the processing unit configure the system to provide: notification reception functionality for receiving consumption notification messages from a plurality of consumption device, each of the received consumption notification messages including subscriber information, content consumption device information, media content playback event identifier, and media content information; and writing the received consumption notification messages to a file.

Media assets or content may be provided to a subscriber through various communication channels (i.e. via various distribution or delivery platforms). For example, a user may be able to receive media content, such as television shows, movies, sporting events, music etc. from a satellite TV provider, a cable TV provider, an IPTV (Internet Protocol Television) provider, an internet service provider (ISP), a cellular network provider etc. Each content provider or distributor may have a respective distribution channel or delivery platform for providing media content to a subscriber. In addition, a single content provider may provide content to subscribers over one or more distribution channels or delivery platforms. For example, a company or service provider may provide satellite TV or cable television service, cellular network service, and internet service. A single user may have a subscription for receiving content via each of the different distribution channels or delivery platforms. However, each different content distribution channel or delivery platform may provide its content from respective content stores, even if the content is the same. That is, multiple versions of the same content, such as a television show, may be stored in multiple different locations, and possibly under different names or identifiers, for distribution by the different distribution channels or delivery platforms.

Depending upon the distribution channel (delivery platform), and possibly the communication network type, different content may be available to a subscriber. For example, a user may be a subscriber to IPTV services as well as mobile TV services. The IPTV service may allow the subscriber to watch subscribed-to-TV channels while in their home environment (e.g. using a conventional STB/TV set-up or on a tablet or other device via an in-home wired and/or wireless (WiFi) network). The mobile TV service may also provide content, which may or may not overlap with the IPTV content, to the subscriber's mobile device for consumption over the cellular network. Thus, a subscriber may be able to access content on multiple devices, from multiple service offerings across multiple distribution channels or platforms. As described further below, it is both desirable and possible to monitor content consumption of a subscriber on a mobile device as well as other devices. The content consumption monitoring may allow real-time, or near real-time, tracking of content being consumed by a user or subscriber. The content consumption monitoring may be used to enforce concurrency rules associated with the content, bookmarking of content viewing for subsequent resumption, as well as billing and/or reporting.

Figure 1:
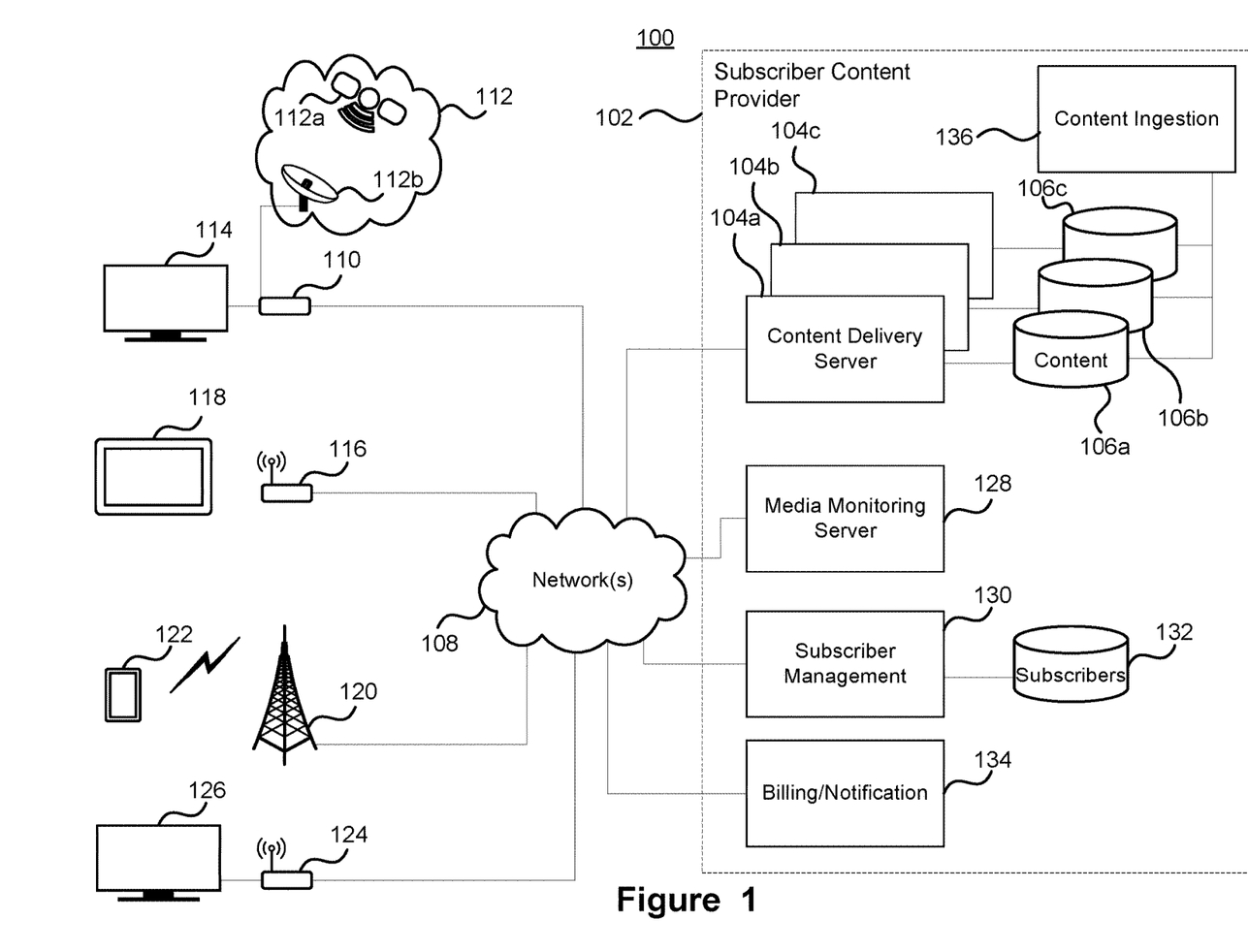
FIG. 1 depicts a content consumption system.

FIG. 1 depicts an example of a content consumption system 100. The system 100 depicts a subscriber content provider or distributor system 102 that can provide media content to subscribers. The content provider or distributor system 102 may include a plurality of different content distribution or delivery channels, depicted as content delivery servers 104a, 104b, 104c (referred to collectively as content delivery servers 104) and corresponding content data stores 106a, 106b, 106c. Although each content delivery server is depicted as delivery content from its own associated content data store, it is possible that one or more of the content delivery servers 104 may deliver content from a common content store. As an example, content delivery server 104a and content store 106a may provide a streaming IPTV service to subscribers, content delivery server 104b and content store 106b may provide mobile TV services to subscribers and content delivery server 104c and content store 106c may provide satellite TV services to subscribers. Each of the content delivery servers 104a, 104b and 104c may distribute content across a respective network, which may include the internet, cellular networks, satellite communication networks, telephone networks, cable networks, or other networks.

The media content may be distributed over respective networks 108 from the content delivery servers 104 to one or more content consumption devices of a user. The content consumption devices may include, for example a set top box (STB) 110 that receives the media content from a head-end system over a satellite network 112 comprising a satellite 112a and a receiving dish 112b connected to the STB 110. The STB 110 may be connected to a television 114. Additionally or alternatively, the functionality of the STB 110 may incorporated into the television itself. Media content may also be streamed to content consumption devices such as a tablet 118, smartphone or other portable device over a wired and/or wireless (e.g. public or private WiFi) network provided by an access point 116. The media content may also be delivered to a smart phone 122, tablet or similar portable device, over a cellular communication network 120. Media content may also be provided to a cable TV or IPTV STB or IPTV-capable television 126 via an in-home network, supported by a wired and/or wireless (e.g. WiFi) access point or STB 124. Although various content consumption devices are described herein, it will be appreciated that these devices are only intended as examples and the media content may be provided to a content consumption device in other ways.

The subscriber content provider system 102 can provide media content via different distribution systems or delivery platforms, which may be separate from each other. In order to provide an improved user experience in accessing content across multiple platforms or distribution systems, a media monitoring server 128 may be provided that monitors the media content (or media assets) being consumed by a user or a subscriber. As described further herein, the media monitoring server 128 can monitor the content being consumed on a device and can control the delivery of content to the user or subscriber as well as store details about the consumption of the content, such as when playback started and stopped, the device the content was viewed on, a network used to access the content etc.

The media monitoring server 128 may interact with a subscriber management system 130. The subscriber management system 130 may store subscriber information in a subscriber data store 132. The subscriber information may include, for example, a unique subscriber identifier, account information for each of the content delivery systems (distribution platforms) 104 the subscriber has an account for, billing information, etc.

The media monitoring server 128 may also interact with a billing notification system 134 that uses the content consumption information in order to provide metering and billing based on the content consumed, as well as possibly the connection type used in consuming the content.

As described above, media content can be provided to a subscriber over different communication channels and different distribution systems or delivery platforms. The media content may be sourced from a content provider. It will be appreciated that the content provider may be a third party distinct from the content distributor or they may be one and the same. The content provider can provide the media content and any metadata associated with the media content for storage in one or more of the content stores 106. Each of the content delivery systems of the content distributor may have specific requirements with regard to the encoding of the media asset and the formatting of its associated meta data. As depicted in FIG. 1, the subscriber content provider or distributor system 102 may include a content ingestion component 136 for receiving the media content and encoding the media asset and its associated metadata for distribution across the various different distribution systems or delivery platforms. The content ingestion component 136 may also be adapted to format the received metadata in accordance with the formatting requirements of the different distribution or delivery systems.

Figure 2:
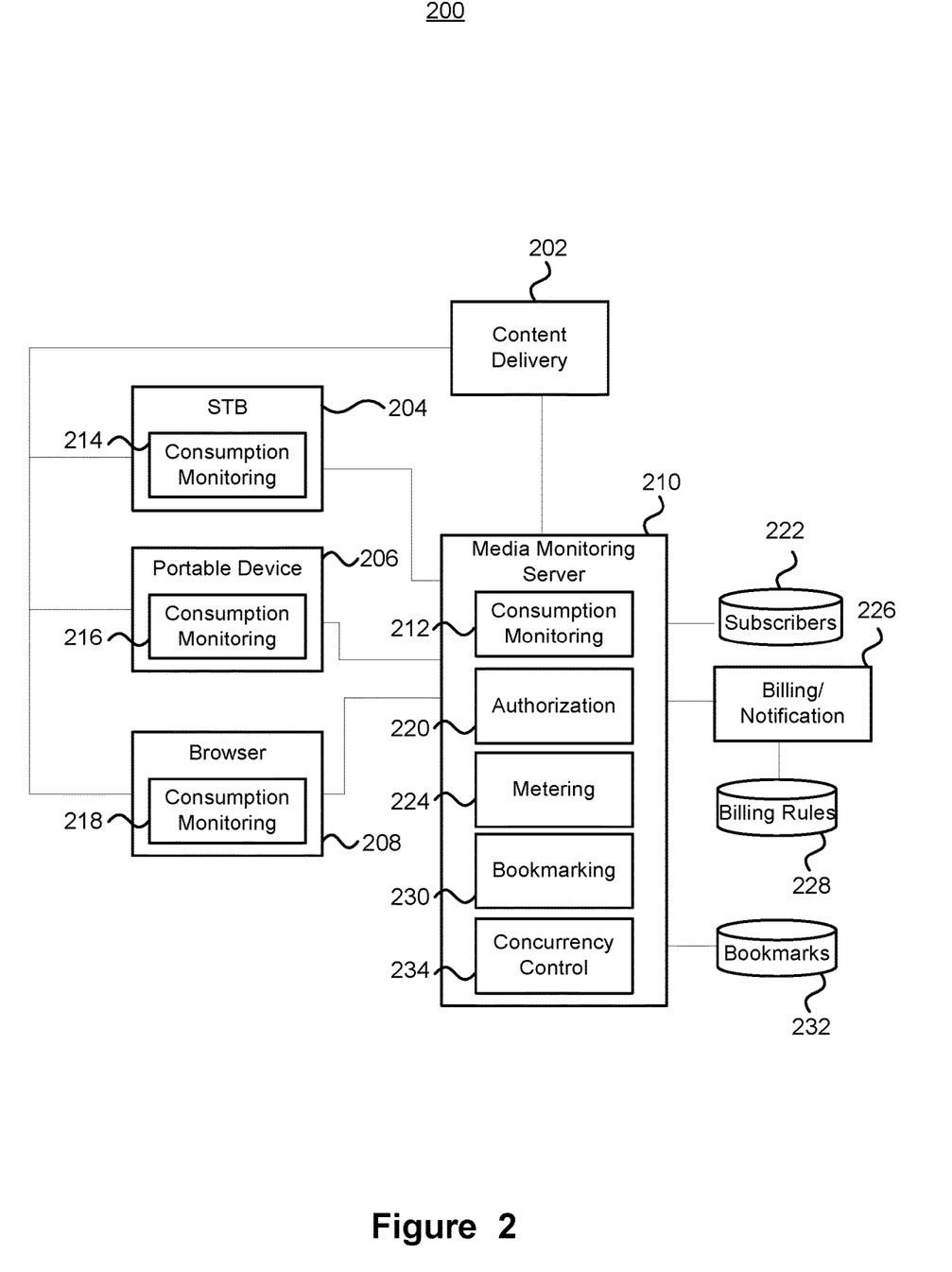
FIG. 2 depicts a system for monitoring consumption of content on devices.

FIG. 2 depicts an example of a system 200 for monitoring consumption of content on devices. The system 200 may be implemented in the environment 100 described above. A single content delivery server 202 is depicted in FIG. 2 for simplicity. The content delivery server may distribute content to various content consumption devices. The content consumption devices may include, for example a STB 204, an app running on portable device such as a smart phone or tablet 206 or a browser 208 running on a computing device. Each of the content consumption devices 204, 206, 208 include respective consumption monitoring functionality 214, 216, 218. In a non-limiting example, the consumption monitoring functionality may be implemented by a client application resident on the content consumption device.

The consumption monitoring functionality 214, 216, 218 sends notification messages to the media monitoring server 210, and in particular to consumption monitoring functionality 212 of the media monitoring server 210. The notifications may be periodic monitoring or reporting records sent at regular intervals as determined by a monitoring timer or based on the occurrence of playback events. For example, a mobile TV application on a mobile device, such as a smart phone, may generate monitoring records according to application usage and user activities during video content playback. The monitoring records may be periodically sent back to the media monitoring server 210. The monitoring records may be sent to the media monitoring server 210, for example, every X (e.g. 5) minutes. Additionally or alternatively, the monitoring records may be sent from the content consumption device as soon as monitoring records are generated. For example, the playback application may send a monitoring record when playback of some content is initiated, paused, stopped, etc.

The monitoring records are sent from the consumption device to the consumption monitoring functionality 212 on the media monitoring server 210, which may write the received monitoring records into flat files or other data structures for storage. The use of flat files may provide a simple storage means for temporarily storing monitoring records from a plurality of users or subscribers. A single flat file may be used to temporarily store the monitoring records received from a plurality of consumption devices. The flat file may be periodically closed and a new flat file created to store received monitoring records. The flat files may be processed and the individual monitoring records stored in another structure such as a monitoring database.

The monitoring records received at the media monitoring server 210 may be used for various purposes. For example, the information contained in the monitoring records may be used for calculating precise video consumption by an amount of time the content was viewed, and to apply metering on video consumption per network type, customer type, and content type. Thus, the monitoring records allow actual time charging with the ability to track exact start and stop times, and provide precise metering. The monitoring records also enable charging based on a network used to access the content such as over Wi-Fi as well as over cellular networks. The received monitoring records may also be processed and analyzed for business purposes and used to produce comprehensive reporting/analysis. Specifically, the processing of the monitoring records may allow for the detailed capturing of user behaviors for analysis/reporting and to produce usage reports for revenue sharing partners as required. The monitoring records issued by content consumption devices may also be used to establish sessions for concurrency control enforcement. The monitoring records may also be leveraged to enable bookmarking functionalities to enhance users' experience.

The monitoring or reporting records may provide various information on the content being viewed or consumed. The attributes captured by the reporting records may include, but are not limited to, for example:

Sequence: an integer that increases with each record transmitted. May reset back to 0 after reaching a maximum number subID: unique ID to identify mobility customers TVA: 16 digits TV account ID DeviceID: unique ID for each device DeviceModel: a string identifying a device model Platform: a string identifying an operating system of the device OSVersion: a string identifying a version of the operating system DeviceSerial: A string for a serial identifier of the device. It may be a hash of one or more characteristics of the device such as installed functionality StartTime: Time to begin to watch the session StopTime: Time to complete watching the session Status: Events ("Play", "Pause" & "Stop") received from the player Book: a number of seconds from a beginning of playback that viewing stopped. May be 0 for live content ContentName: a string of the content's name ContentProvider: a string identifying the provider of the content NetworkType: Cellular or WiFi ContentLength: a number of seconds for the complete duration of the content item InHome: "TRUE" if watching TV at home over WiFi; "FALSE" otherwise ContentType: Live, S-VOD, Movie, Trailer, PPV ContentSource: Mobility, IPTV, DTH, Guest DeliveryType: a string identifying whether the content was streaming or downloaded AssetID: a string identifying an asset being viewed AppVersion: a string identifying the version of the consumption application When the consumption monitoring functionality indicates that a particular subscriber is viewing a stream, the information may be used to enforce concurrency rules, which may indicate for example that only one copy of the content may be viewed by the subscriber at a time. If the consumption monitoring functionality 212 of the media monitoring server 210 does not receive a monitoring record within a predetermined period of time, for example 11 minutes, the consumption monitoring functionality 212 may assume that an error has occurred on the content consumption device and release the content stream for consumption by another device falling under the same subscriber account as well as possibly record an error in the monitoring records.

The monitoring records may be sent in various forms such as, for example a JavaScript Object Notation (JSON) message. For example, the JSON message may provide:

```
{
    "SessionID": "B99DFA4D-67A2-48B0-9743-817A2460EB70",
    "Sequence": 0,
    "SubID": "000000001756785882161745515129183989941-
023X_wap2.bellmobility.ca",
    "TVA":" "8455700600031569",
    "DeviceID": "56D410F6DDEE2EF35A4B484B75436536",
    "DeviceModel": "iPhone1_1",
    "OSVersion": "5.1.1",
    "DeviceSerial": "56D410F6DDEE2EF35A4B484B75436536",
    "StartTime": 1336716946,
    "StopTime": 1336768892,
        "Status":"Play",
        "Book":1245,
    "ContentName": "Market Sense",
        "ContentProvider": "Disney",
    "NetworkType": "wifi",
    "InHome": TRUE,
    "ContentType": "Live",
    "ContentSource": "Mobility",
    "DeliveryType": "Streaming",
    "AssetId": "1245637",
    "AppVersion": "4.2.3"
},
```

The monitoring records may be generated for various playback statuses of video content, including for example "Play", "Pause" and "Stop". An event that results in status "Play" may be, for example, a monitoring timer reaching the end of the X-minutes interval, or the user initiating playback of a media asset on his/her device 206. Upon receiving a "Play" event, the consumption monitoring functionality or application 216 may send an immediate monitoring record, re-set the monitoring timer and continue playing the media asset. No bookmark information is saved by the media monitoring server 210 on receiving a status "Play" monitoring record, unless the media monitoring server 210 doesn't receive another monitoring record for X minutes. Similarly, with regard to concurrency control and enforcement, the stream or media asset is not released on status "Play" unless the media monitoring server 210 doesn't receive another monitoring record for X minutes.

Events that result in status "Pause" monitoring records may include a user clicking on the Pause (II) button, or an outside-of-application event interrupting a currently playing video stream. If the content is being consumed on a device such as a smart phone the outside-of-application event may be for example, a call, calendar alert, briefly lost network connection or other events. Upon receiving a "Pause" event, the consumption monitoring functionality or application 216 may save the monitoring record with status "Pause" to a monitoring cache, re-set the monitoring timer, and not send an monitoring record until the monitoring timer reaches the end of the pre-defined X-minutes interval. Alternatively, the consumption monitoring functionality may send or issue the monitoring record when the playback event occurs instead of caching the monitoring record for subsequent sending. Sending monitoring records when playback events occur may provide an improved user experience when a user views content across multiple devices and switches device midway through the content.

"Pause" behavior across different content (or media assets) and platforms may be different for different operating systems and based on the content being viewed. For example, when watching video on demand (VOD) in the foreground on device running Android or iOS, the application may allow the user to pause the stream indefinitely except in case of an application crash, network loss or power off situation etc. On these devices, the media monitoring server may receive a "Pause" monitoring record every X minutes, where X may be for example 5 minutes. With regard to concurrency control, the stream may not be released when these Pause monitoring records are received. The user can subsequently resume playback from the same time instance, and no playback request is required. For an application crash, network loss or power off situation or any other case where a Pause monitoring record is not received by the media monitoring server, the media monitoring server may set a bookmark and release the stream after, for example, 10 min of receiving the last monitoring record. On restart, playback will start from the bookmark received in the last monitoring record. When watching VOD in the foreground on a BlackBerry OS 10 (BB10) device, pause controls are available to the user, and the full overlay control may be maintained. The application provides the same behaviour as described above for Android/IOS in Foreground VOD.

When watching live content in the foreground on an Android/IOS device, functionality is the same as for Android/IOS in Foreground VOD. For BB10 devices, functionality is similar to BB10 in Foreground VOD; however, there is no overlay control. Pause can be triggered by an inactivity timer. Clicking/touching the screen after inactivity timer triggers, may trigger current video to be reloaded even after stopping.

When watching VOD or live content on an Android/IOS device, the media monitoring server may receive a "Stop" monitoring record when the stream is stopped at the consumption device and the stream will be released by the media server. When watching VOD or live content on a BB10 device the media monitoring server may receive a Pause monitoring record upon occurrence of a pause event. The stream may not be released; and the user can resume playback in the foreground within 10 seconds. At timer=10 sec, while the content consumption application is in the background (or Pause Live in foreground), the application may then send monitoring report with status=stop to the media monitoring server and the stream is released. If while in the background, or Pause Live while in the foreground for more than 10 seconds, when playback resumes, the application must request playback from the media monitoring server for playback permission. The 10 seconds threshold may be configurable on the server and could be modified. The monitoring reports may include information on the type of device, such as iOS, android or BB10. No bookmark needs to be saved on status "Pause". The concurrency stream may not released on status "Pause".

Events that result in status "Stop" monitoring records being generated and transmitted to the monitoring server may include for example:
  the content consumption application exits;
  the content consumption application is moved to the background;
  device goes into lock screen mode (the application is backgrounded in this case);
  user switches content: if the user switches content at the same time as X-minutes interval expires, i.e. there's a conflict between "Stop" and "Play", the "Stop" status monitoring record should be sent. Content switch is when switching VOD or a live channel, and does NOT include show or programming changes when watching the same channel.
  network switch;
  network switch between Wi-Fi access and cellular access;
  network switch from in-home Wi-Fi to out-of-home Wi-Fi. If the application caches the monitoring record for the network switch, the monitoring record should be sent immediately when the new network is acquired i.e. before sending the Playback request for the media asset.
  the TV account value is changed (this includes change to/from 'no TV account' situations).

Upon receiving the Stop event, the content consumption client application should (for non-network switch) send an immediate monitoring record, re-set the monitoring timer and cease playing the asset. Subsequent Playback permission is required after sending the monitoring record with status "Stop" in order to resume playback. The media monitoring server may provide the playback permission based on concurrency rules associated with the requested content.

During a network switch and content switch, the playback functionality may listen for the media monitoring server's response after sending the immediate Stop event. The application should: send the immediate monitoring record, and re-set the heartbeat or monitoring timer. Once any media monitoring server response is received, the playback functionality will send a playback request immediately. If no response from the media monitoring server is received for 1 second, the playback functionality may also send playback request.

The bookmark is saved on status "Stop". The concurrency stream may also be released by the media server when a "Stop" monitoring record is received.

As described above, the media monitoring server 210 may receive monitoring records indicating various playback events. The media monitoring server may include functionality for authorizing 220 playback of requested content. The authorization functionality 220 may utilize subscriber information stored in a subscriber data store 222 in order to determine if the subscriber is authorized to access the content, possibly based on the requested content, the subscriptions of the subscriber and the network connection type and/or location the user is connecting from as well as concurrency rules which may specify a number of content streams that may be viewed simultaneously.

The media monitoring server 210 may also include metering functionality 224. The metering functionality may process the received monitoring records and process them in order to meter the consumption of the content. The metering may be used to notify users of their consumption, for example to warn of any approaching thresholds, as well as for billing purposes. The billing and notifications may be performed by a separate billing and/or accounting system 226. The billing may be based on billing business rules, which can be stored in a data store 228.

The media monitoring server 210 may further include bookmarking functionality 230. The bookmarking functionality 230 may receive monitoring records in order to determine where exactly playback within a particular media asset or content stream was stopped. The bookmarks may be saved in a bookmark repository 232 and used to subsequently restart playback of a given media asset at the last or stopped location.

Figure 3:
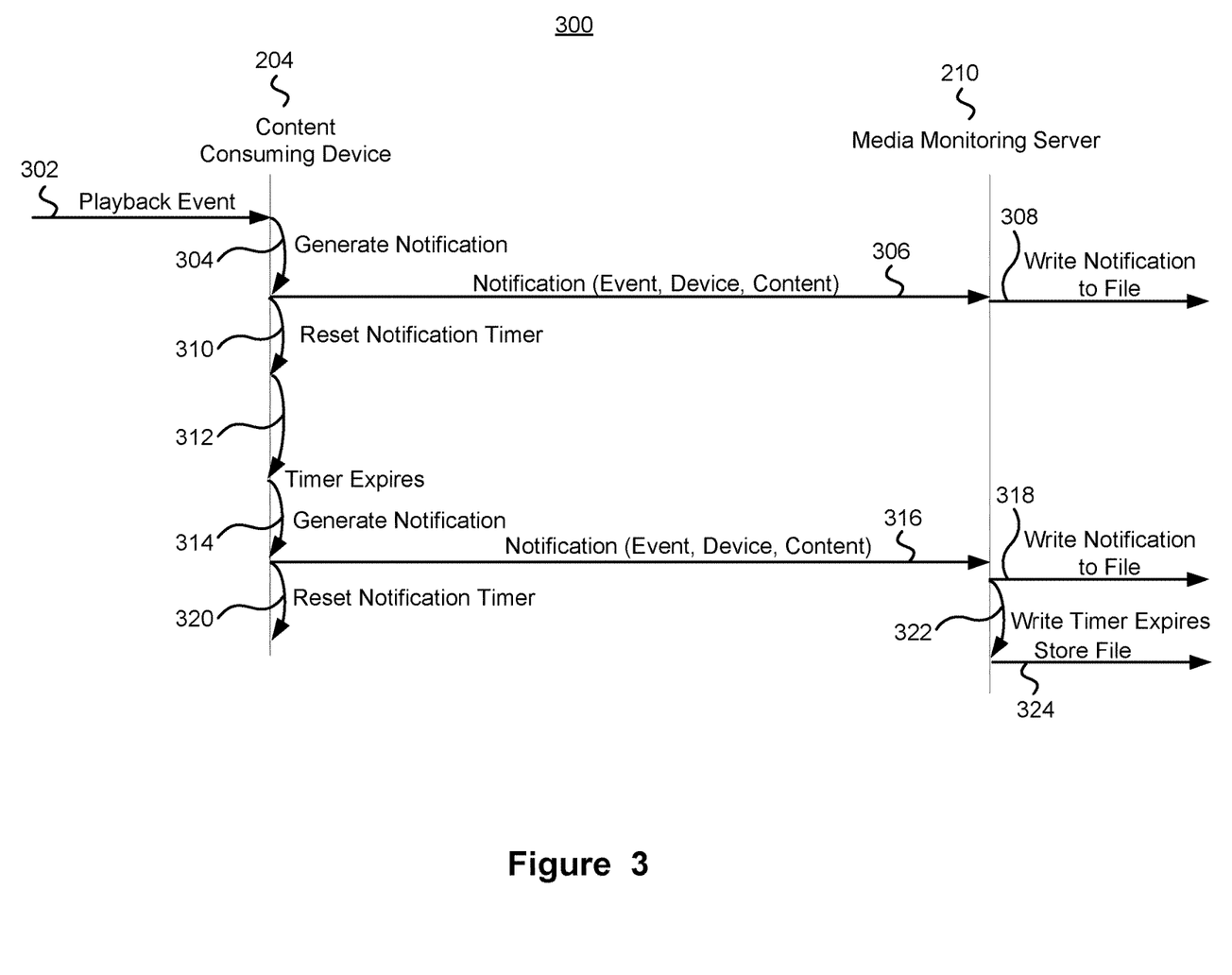
FIG. 3 depicts a process flow for monitoring consumption of content on devices.

FIG. 3 depicts a process flow 300 for monitoring consumption of content on content consumption devices. The process flow 300 depicts the process between a content consuming device such as a smart phone 204 and the media monitoring server 210. The content consuming device 204 receives a playback event 302 and generates a monitoring record 304, referred to further below as a notification for brevity. The notification is sent 306 from the content consuming device 204. The notification may include information about the playback event such as start and/or stop times, device identifying information and/or subscriber identifying information, and content identifying information. The notification is received at the media monitoring server 206 and writes the notification to a flat file 308 or other data structure. When the notification is sent, the content consuming device resets a monitoring or notification timer 310. When the timer expires 312, without another playback event occurring, another notification is generated 314, which may be the substantially the same as the previous notification, and sent 316 to the media monitoring server 210. The notification is received and written to the file 318. When the notification is sent, the content consuming device 204 again resets the notification timer 320. The media monitoring server 210 may write the received notifications to a file, which may be periodically stored. The media monitoring server 210 may for example write the file to storage every 15 minutes. A write timer may be used, which when it expires 322, the file is stored 324. The stored files may be further processed for example billing and/or reporting purposes.

Figure 4:
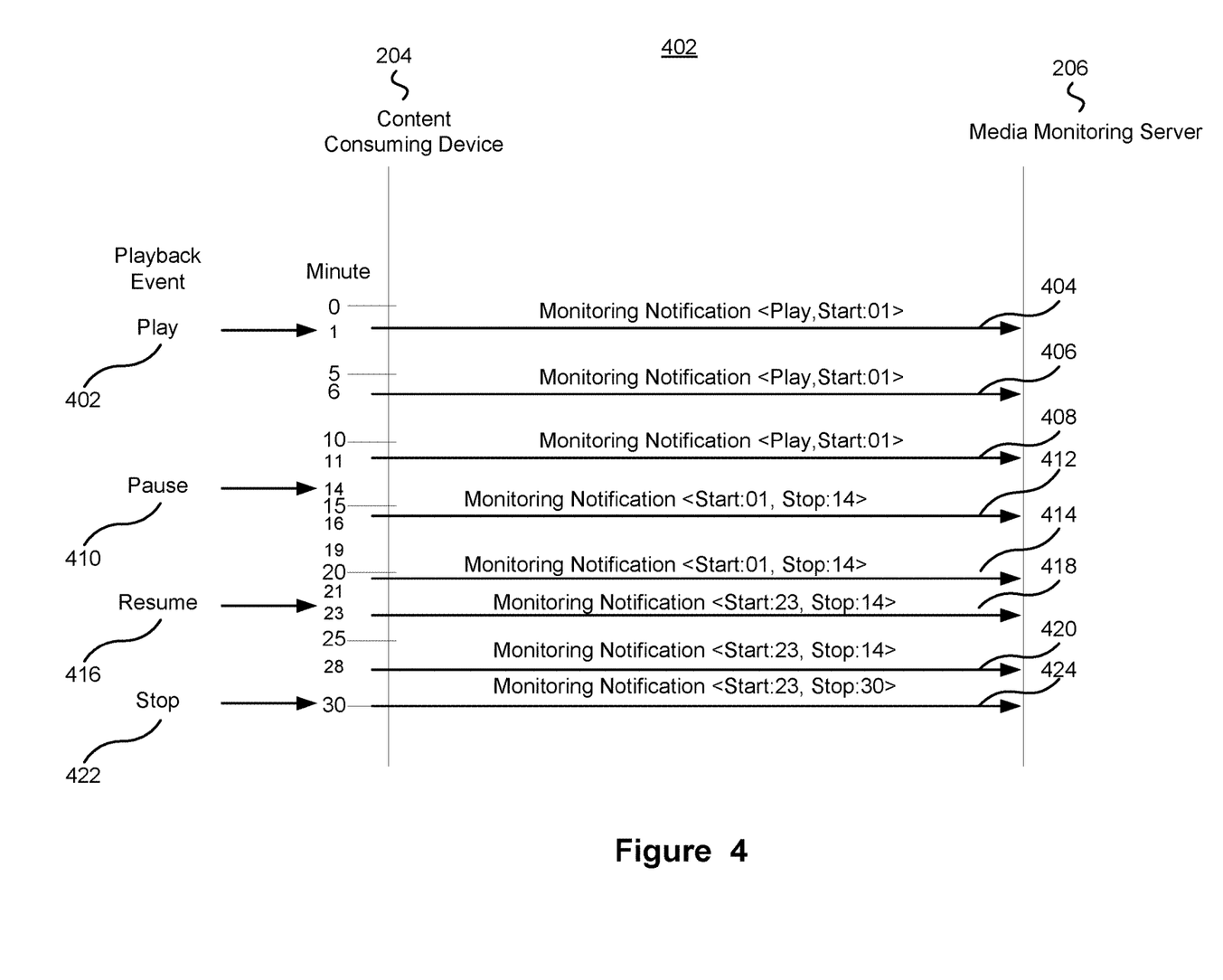
FIG. 4 depicts a further message flow for monitoring consumption of content on devices.

FIG. 4 depicts a further message flow 402 for monitoring consumption of content on devices. As depicted, a Play event 402 occurs at minute mark 1 and the content consuming device sends a notification to the media monitoring server 210 that includes an indication of the play start time 404 of the media asset. Although only the start and stop times are depicted as being included in the notifications, the notification may also include additional information as described above. Once the Play notification is sent, the consumption device 204 begins the notification timer, which as depicted, expires every 5 minutes although it will be appreciated that other lengths of time are possible. In this example, when the notification timer expires at the 6 minutes mark, the consumption device sends the Play notification 406 to the server 210 again indicating when the Play event was initiated, namely at the 1 minute mark. Again the notification timer is reset and once it expires, another Play notification 408 is sent to the media monitoring server 210.

At the 14 minutes mark, a Pause event 410 occurs. The consumption device 204 caches the Pause event until the notification timer expires. When the notification timer expires at the 16 minutes mark, a notification 412 is generated and sent for the previous Pause event. The Pause event may specify a stop time, namely the time the Pause event occurred along with the initial start time of the content stream. Once the Pause notification is sent, the notification timer may be reset and another notification sent upon expiry at the 21 minutes mark. The notification 414 sent upon expiry of the timer is substantially the same as the previous notification.

At the 23 minutes mark, a Resume event 416 occurs and a notification 418 is likewise sent to the media monitoring server 210 that specifies a Play event and may include the play time, namely 23 minutes. After sending the notification, the notification timer is reset and a subsequent notification 420 sent again when the timer expires at the 28 minutes mark. A Stop event 422 occurs at 30 minutes and a Stop notification 424 is sent to the media monitoring server 210.

As described above, the notifications, or the monitoring records, may be processed in order to provide various functionality. The notifications may include bookmarking information that can allow playback to be resumed after stopping or pausing playback.

Figure 5:
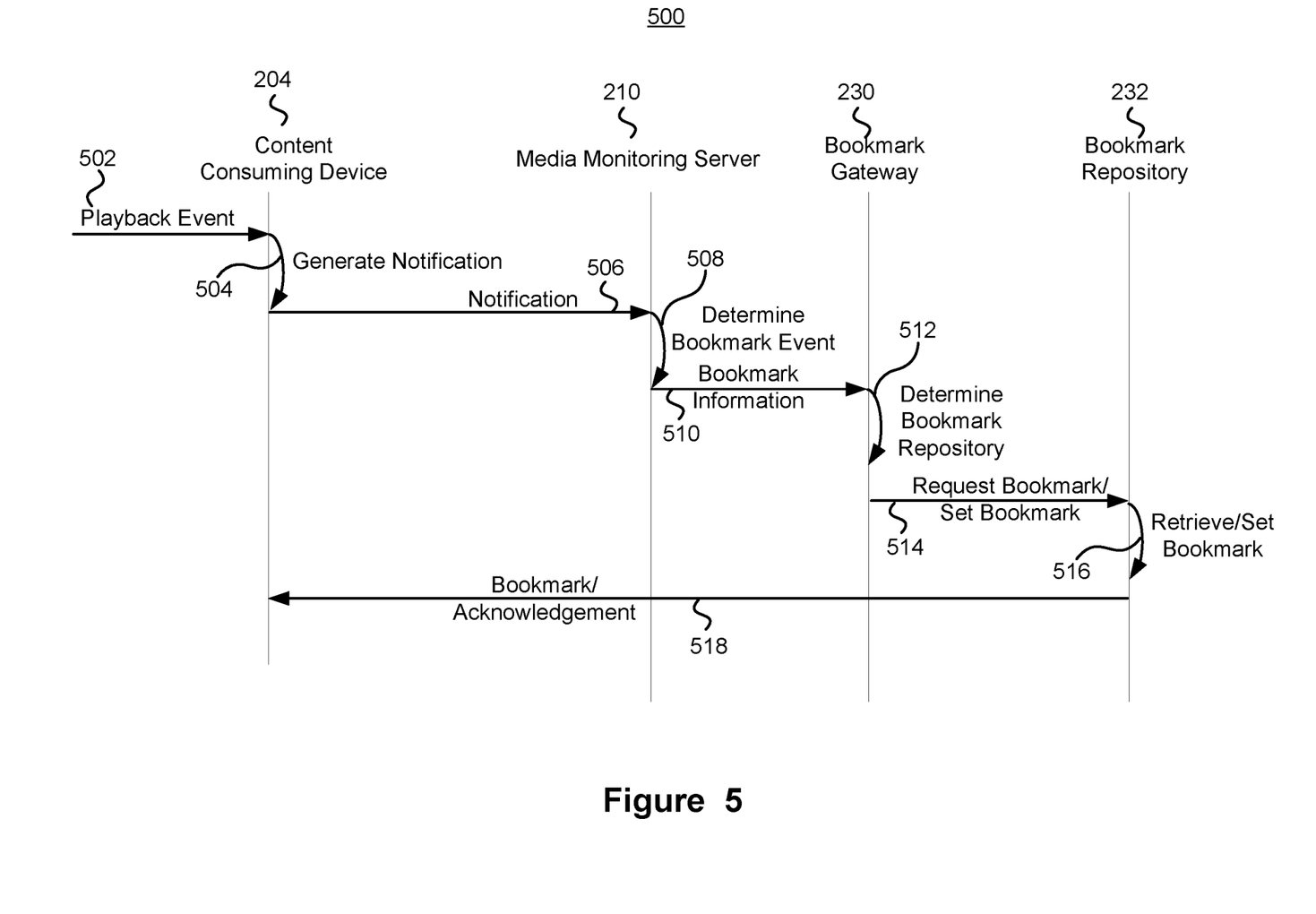
FIG. 5 depicts a process flow for providing viewing bookmarks in content.

FIG. 5 depicts a process flow 500 for providing viewing bookmarks during content playback. The process or messaging flow 500 depicts the process between the content consuming device 204, the media monitoring server 210, the bookmarking functionality or gateway 230 and the bookmark repository 232. A playback event occurs 502 and notification is generated 504 and sent 506 to the media monitoring server 210. The media monitoring server 210 receives the notification and determines a bookmark event 508 associated with the notification or event. For example, a Play event may be associated with retrieving a bookmark in order to resume the playback of a media asset from where it was interrupted. Alternatively, a Stop event may be associated with storing a bookmark in order to subsequently resume playback at a later time from where the content playback was stopped. The bookmark information is sent 510 to the bookmark gateway 230, which receives the bookmark information and determines an appropriate bookmark repository 512 to store the bookmark in. For example, different content may be provided from or by different content distribution services, which each may have a respective bookmark repository. The bookmark information is requested (for Play events) or set (for Stop events) 514 and the repository retrieves or sets the bookmark 516 and returns the bookmark information or an acknowledgement 518 that the bookmark has been set.

Each content delivery platform or distribution system may store corresponding media assets using different identifiers. The bookmark gateway 230 may map different asset identifiers to each other across the various different delivery systems. The bookmark gateway 230 may also set corresponding bookmarks in each bookmark repository such that if a bookmark request is received at a given repository, for example by a legacy device that does not support the media consumption monitoring functionality, the bookmark information may still be retrieved. Advantageously, the bookmarking functionality allows a users to transition smoothly from one device to another with no need to restart videos from the beginning.

Figure 6:
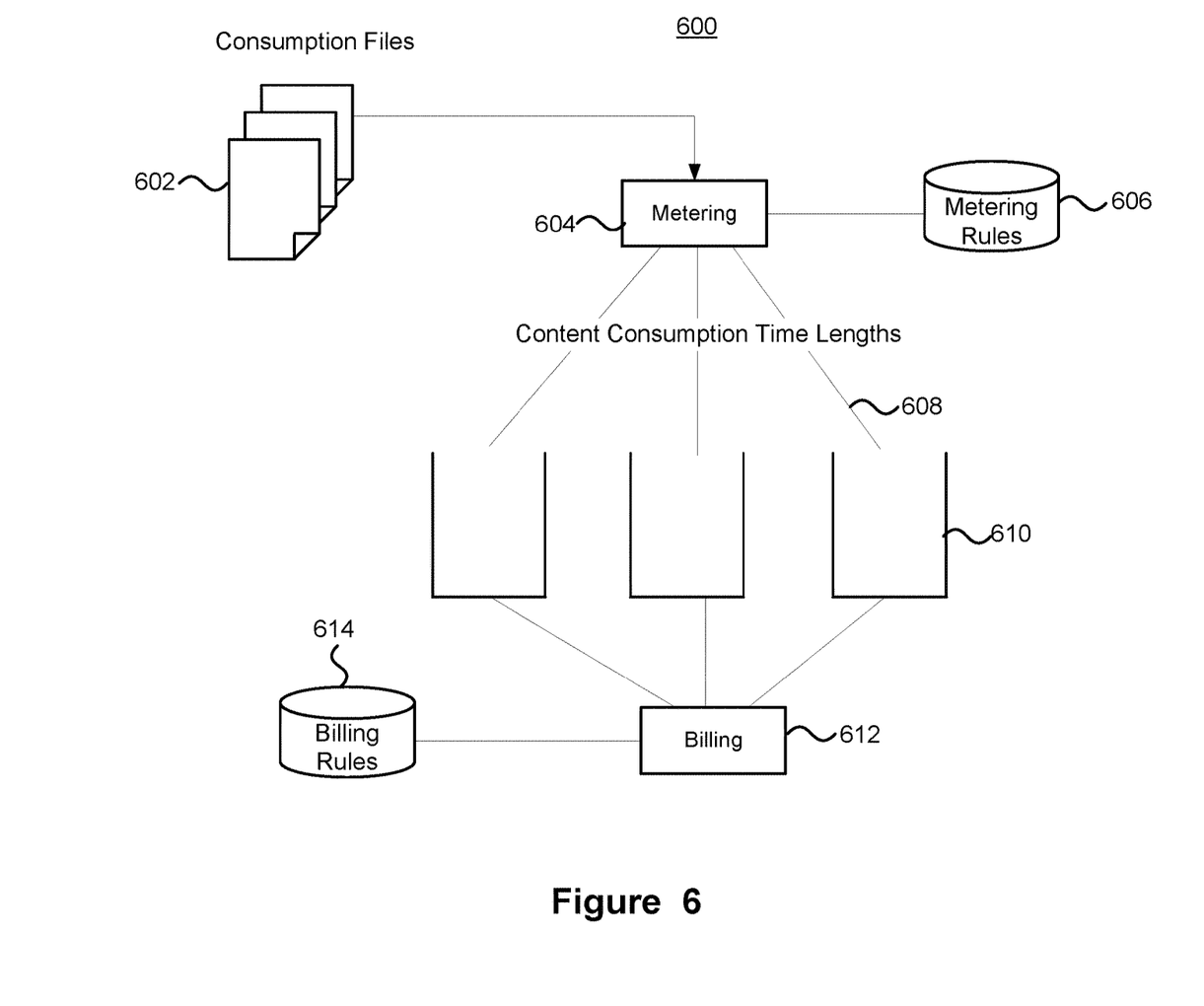
FIG. 6 depicts a process for metering content consumption.

FIG. 6 depicts a process 600 for metering content consumption. The notifications or monitoring records may include precise information on the start and stop times of content being consumed, as well as the type of connection the content is being consumed over, as well as the content type. The notifications or monitoring records can be processed in order meter the content consumption to facilitate billing, provide alerts or notifications when consumption approaches a predefined threshold as well as for detailed reporting purposes. As depicted in FIG. 6, the process 600 includes processing the monitoring records or consumption files 602 by metering functionality 604 and metering rules 606. As depicted, the metering functionality 604 may place content consumption 608 into one of a plurality of buckets 610. After processing, each of the buckets may include the total amount of time corresponding content has been consumed. The buckets may then be processed by billing functionality 612, which processes the consumption in the buckets according to billing or business rules 614. For example, the billing rules 614 may provide different weightings for each bucket, or different billing requirements as desired.

For example, the buckets may include buckets for TV and/or VOD content consumed over a cellular network, TV and/or VOD content consumed over a WiFi network while in a home environment as well as TV and/or VOD content consumed over a non-in-home or public WiFi network. It will be appreciated that cellular and WiFi usage metering is flexible. The buckets of each category or field are configurable. Also, the number of buckets in each category or field can be added or removed. Once a usage falls into a particular bucket in the charging scheme, usage metering may have configurable settings to define if this usage is chargeable, non-chargeable, or impossible (i.e. an invalid scenario). Impossible scenarios may be recorded in error logs for error detection and early resolution.

Figure 7:
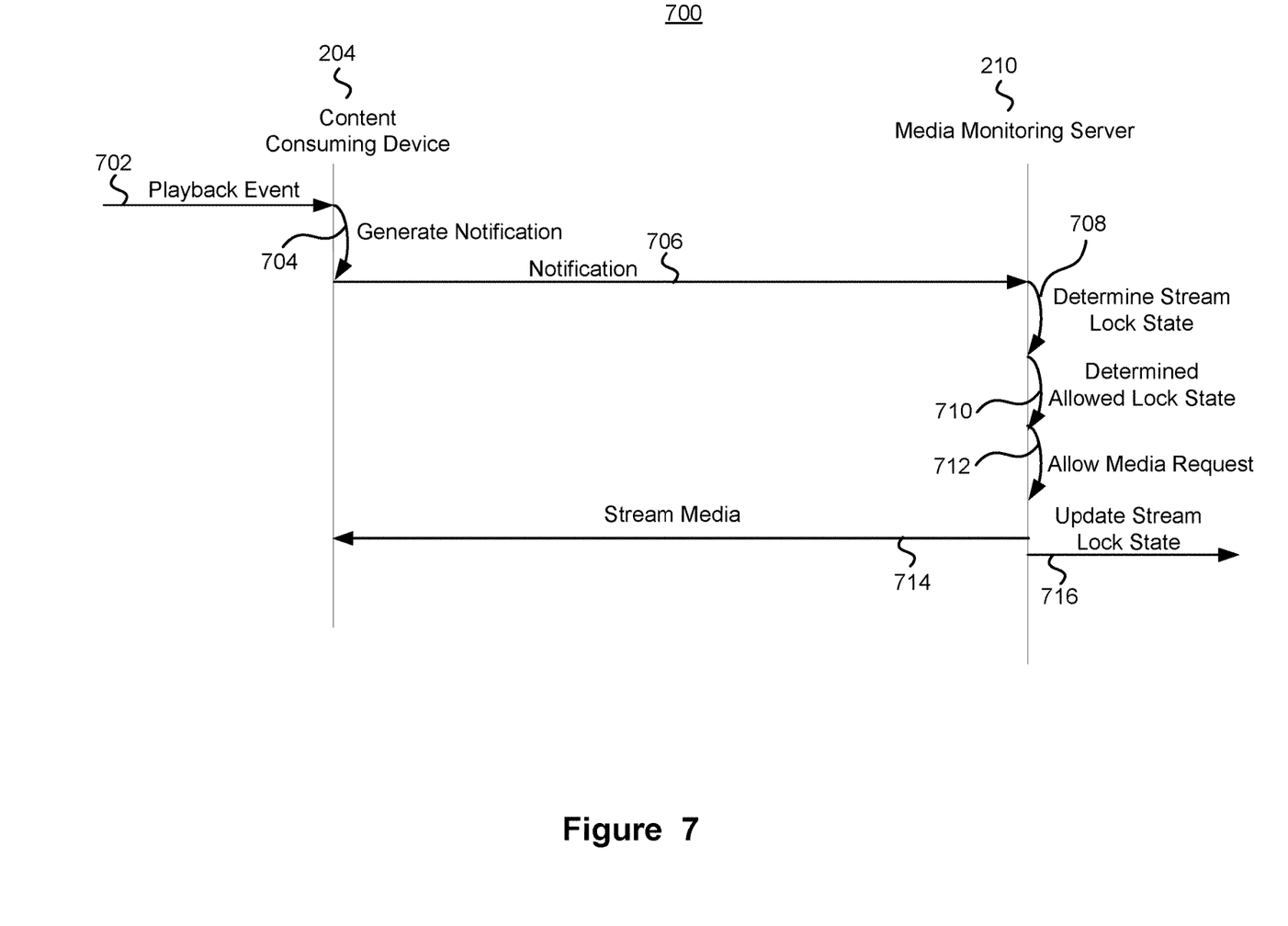
FIG. 7 depicts a process for controlling concurrent access to content.

FIG. 7 depicts a process for tracking and controlling the concurrent playback or access to content. In addition to the functionality described above, the monitoring records may also be used to provide a form of concurrency control. That is, the media monitoring server may be adapted to provide the ability to query for permission to play back a media asset. If the subscriber is authorized to view content or a media asset, the permission may be sent back to the consumption device. It will be appreciated that the media monitoring server may consider various aspects in determining if the consumption of the media asset is authorized. For example, in respect of movies, the following may be considered:
    Entitlement
    Roaming
    Device
    OS
    Concurrency
    For subscription VOD (SVOD) and Linear (Live) content, the following may be considered:
    Concurrency In controlling content playback based on concurrency rules, it is necessary to be able to determine the number of content streams being played back. If it is possible to track the number of streams being played, the number of streams may be controlled. The media monitoring server may then authorize, or not authorize, content playback depending upon the content, or possibly other content, that is currently being played back. As an example, the monitoring records received by the media monitoring server may be processed in order to maintain a lock state for a particular content stream. The lock state may indicate the number of content streams that are currently being played back by a given subscriber account. The media monitoring server may control subsequent content playback to allow, for example, only a single stream to be played at any given time, or a plurality of streams to be played concurrently.

As depicted in FIG. 7, the concurrency control process 700 includes receiving a playback event, such as Play, 702 and generating a notification 704. The notification is sent 706 to the media monitoring server 210, which receives the notification and determines the content stream's lock state 708. In order to determine if the Play request is authorized, the media monitoring server 210 determines an allowed lock state for the content 710. If the current lock state of the requested stream does not exceed the allowable lock state the media or content request may be allowed 712 and the media may be streamed 714. The lock state of the media content stream may be updated to reflect the streaming of the content.

Figure 8:
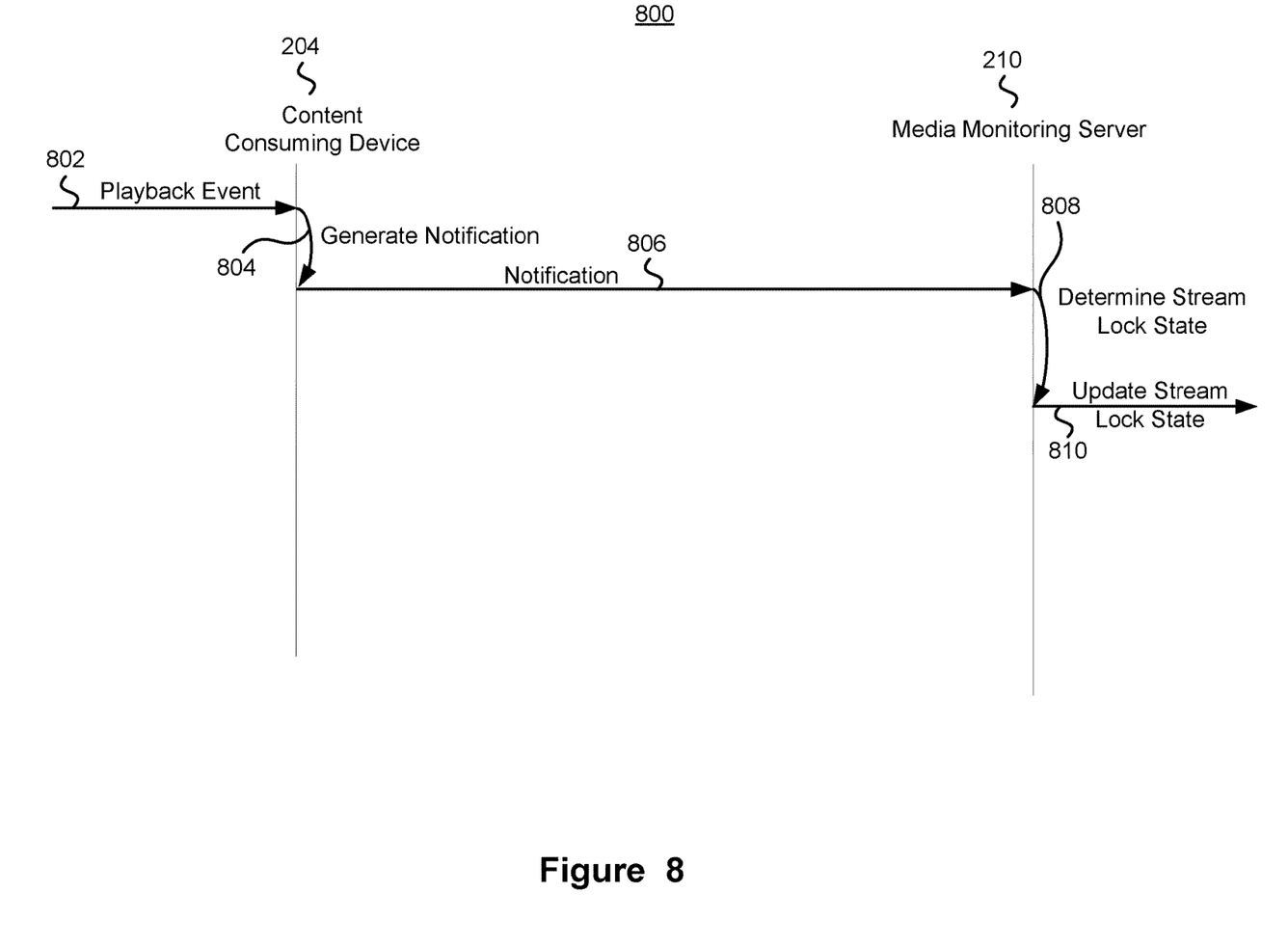
FIG. 8 depicts a further process for controlling concurrent access to content.

FIG. 8 depicts a further process 800 for controlling the concurrent access to content or media streams. The process 800 may unlock a stream. For example, a playback event, such as Stop, may occur at the consuming device 204 and a notification is then generated 804 and sent 806 to the media monitoring server 210. The media monitoring server 210 receives and processes the notification and determines the current stream lock state; the stream lock state 910 may then be updated to reflect that one of the streams being played has been stopped.

The above has described various functionality provided by various systems. The functionality may be provided as a combination of hardware, firmware and software comprising instructions stored in a memory that are executed by a processor. The executed instructions configure devices to provide at least some of the functionality described. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method for monitoring consumption of media content comprising:
    receiving a playback request at a content consumption monitoring system from a content consumption device;
    processing the playback request at the content consumption monitoring system;
    authorizing playback of the media content on the content consumption device based on one or more of: the media content being requested, a customer account, a location of the content consumption device, and an access network used by the content consumption device to access the media content;
    receiving a content consumption notification message at the content consumption monitoring system, the content consumption notification message including a unique subscriber identifier (ID) identifying the customer account, an access network identifier identifying the access network, a media content playback event identifier indicative of initiating playback of the media content at the content consumption device, a start time, and media content information;
    receiving a further content consumption notification message at the content consumption monitoring system, the further content consumption notification message including the unique subscriber identifier (ID) identifying the customer account, the access network identifier identifying the access network, a media content playback event identifier indicative of stopping playback of the media content at the content consumption device, a stop time, and the media content information;

storing the content consumption notification message and the further content consumption notification message in association with the customer account; and determining a charge for the customer account based on subscription information and by determining an amount of time that the media content is played back over the access network, wherein the content consumption notification message and further content consumption notification message are received for each content consumption device used by the unique subscriber identifier to access the media content, and for each access network used by each content consumption device to access the media content, and wherein the charge for the customer account is based on the amount of time that the media content is played back over each access network for each content consumption device.

2. The method of claim 1, further comprising:
processing the playback request at the content consumption monitoring system to determine if a current lock state of the media content does not exceed an allowable lock state of the media content;

sending an authorization to the content consumption device authorizing playback of the media content at the content consumption device if the current lock state of the media content does not exceed the allowable lock state of the media content; and updating, by the content consumption monitoring system, the current lock state of the media content.

3. The method of claim 2, wherein the current lock state associated with the media content provides an indication of a number of streams of the media content currently associated with a subscriber viewing the media content.

4. The method of claim 1, further comprising:
in response to receipt of the further content consumption notification message at the content consumption monitoring system, determining a bookmark repository for storing bookmark information based on a subscriber type; and storing bookmark information associated with the media content in the determined bookmark repository.

5. The method of claim 1, further comprising:
in response to receiving the content consumption notification message at the content consumption monitoring system, determining a bookmark repository for retrieving bookmark information from based on a subscriber type; and retrieving bookmark information associated with the media content in the determined bookmark repository.

6. The method of claim 1, wherein
determining the charge for the customer account is further based on the media content consumed.

7. The method of claim 1, wherein determining the charge for the customer account is based on the amount of time that the media content is played back over any one or more of:
a cellular network;
a home network; and
an out-of-home network.

8. The method of claim 1, wherein the content consumption device generates the content consumption notification message in response to receiving a media content playback event initiating playback of the media content, transmits the content consumption notification message to the content consumption monitoring system, and resets a monitor timer after transmitting the content consumption notification message, and wherein the content consumption device is configured to transmit the further content consumption notification message after the monitor timer expires.

9. The method of claim 1, wherein the access network comprises any one or more of: the Internet, a cellular network, a public wireless network, a private wireless network, a satellite communication network, a telephone network, and a cable network.

10. The method of claim 1, wherein the further content consumption notification message is generated if the access network being used by the content consumption device to access the media content changes.

11. A system for monitoring media content consumption comprising:
a processing unit for executing instructions; and
a memory unit for storing instructions, which when executed by the processing unit configure the system to:
receive a playback request at a content consumption monitoring system from a content consumption device;

process the playback request at the content consumption monitoring system;

authorize playback of the media content on the content consumption device based on one or more of: the media content being requested, a customer account, a location of the content consumption device, and an access network used by the content consumption device to access the media content;

receive a content consumption notification message, the content consumption notification message including a unique subscriber identifier (ID) identifying the customer account, an access network identifier identifying the access network, a media content playback event identifier indicative of initiating playback of the media content at the content consumption device, a start time, and media content information;

receive a further content consumption notification message, the further content consumption notification message including the unique subscriber identifier (ID) identifying the customer account, the access network identifier identifying the access network, a media content playback event identifier indicative of stopping playback of the media content at the content consumption device, a stop time, and the media content information;

store the content consumption notification message and the further content consumption notification message in association with the customer account; and determine a charge for the customer account based on subscription information and by determining an amount of time that the media content is played back over the access network, wherein the content consumption notification message and the further content consumption notification message are received for each content consumption device used by the unique subscriber identifier to access the media content, and for each access network used by each content consumption device to access the media content, and wherein the charge for the customer account is based on the amount of time that the media content is played back over each access network for each content consumption device.

12. The system of claim 11, wherein the instructions, when executed by the processing unit, further configure the system to:
process the playback request at the content consumption monitoring system to determine if a current lock state of the media content does not exceed an allowable lock state of the media content;
send an authorization to the content consumption device authorizing playback of the media content at the content consumption device if the current lock state of the media content does not exceed the allowable lock state of the media content; and
update the current lock state of the media content.

13. The system of claim 12, wherein the current lock state associated with the media content provides an indication of a number of streams of the media content currently associated with a subscriber viewing the media content.

14. The system of claim 11, wherein the instructions, when executed by the processing unit, further configure the system to:
in response to receipt of the further content consumption notification message, determine a bookmark repository for storing bookmark information based on a subscriber type; and
store bookmark information associated with the media content in the determined bookmark repository.

15. The system of claim 11, wherein the instructions, when executed by the processing unit, further configure the system to:
in response to receiving the content consumption notification message, determine a bookmark repository for retrieving bookmark information from based on a subscriber type; and
retrieve bookmark information associated with the media content in the determined bookmark repository.

16. The system of claim 11, wherein the instructions, when executed by the processing unit, further configure the system to:
determine the charge for the customer account based on the media content consumed.

17. The system of claim 11, wherein determining the charge for the customer account is based on the amount of time that the media content is played back over any one or more of:
a cellular network;
a home network; and
an out-of-home network.

18. The system of claim 11, wherein the access network comprises any one or more of: the Internet, a cellular network, a public wireless network, a private wireless network, a satellite communication network, a telephone network, and a cable network.

19. The system of claim 11, wherein the further content consumption notification message is generated if the access network being used by the content consumption device to access the media content changes.

20. A method for monitoring media content consumption, comprising:
receiving a plurality of playback requests associated with a customer account at a content consumption monitoring system;
processing the plurality of playback requests at the content consumption monitoring system;
authorizing each playback of the media content based on one or more of: the media content being requested, the customer account, a location of a content consumption device used to access the media content, and an access network used by the content consumption device to access the media content;
receiving a first plurality of content consumption notification messages with the customer account, each content consumption notification message comprising a unique subscriber identifier (ID) identifying the customer account, an access network identifier identifying a first access network used by a content consumption device to access the media content, a media content playback event identifier indicative of a playback event at the content consumption device, a time associated with the playback event, and media content information;
receiving a second plurality of content consumption notification messages associated with the customer account, each content consumption notification message comprising the unique subscriber identifier (ID) identifying the customer account, an access network identifier identifying a second access network used by a content consumption device to access the media content, a media content playback event identifier indicative of a playback event at the content consumption device, a time associated with the playback event, and media content information;
storing the first and the second pluralities of content consumption notification messages in association with the customer account; and
processing the first and the second pluralities of content consumption notification messages to determine a charge for the customer account based on subscription information and by determining an amount of time that the media content is played back over each of the first and second access networks,
wherein the content consumption notification message and further content consumption notification message are received for each content consumption device used by the unique subscriber identifier to access the media content, and
wherein the charge for the customer account is based on the amount of time that the media content is played back over each of the first and second access networks for each content consumption device.

* * * * *